R. C. ISPHORDING AND G. H. SCHULTZ.
GASOLENE RESERVOIR FOR AUTOMOBILES.
APPLICATION FILED SEPT. 18, 1919.
1,343,173. Patented June 8, 1920.
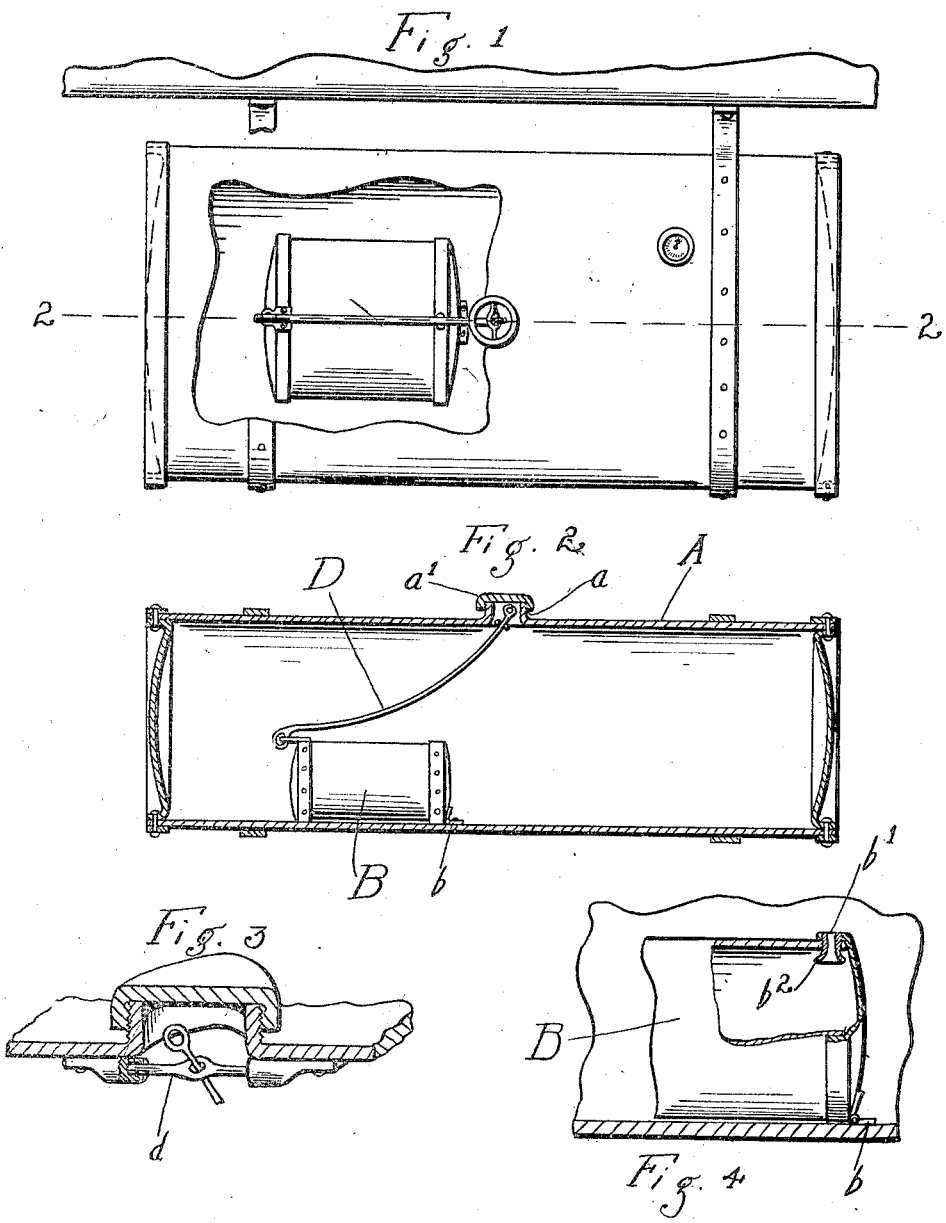

UNITED STATES PATENT OFFICE.

RICHARD C. ISPHORDING, OF CINCINNATI, OHIO, AND GEORGE H. SCHULTZ, OF FORT THOMAS, KENTUCKY.

GASOLENE-RESERVOIR FOR AUTOMOBILES.

1,343,173.     Specification of Letters Patent.     Patented June 8, 1920.

Application filed September 18, 1919. Serial No. 324,625.

*To all whom it may concern:*

Be it known that we, RICHARD C. ISPHORDING and GEORGE H. SCHULTZ, citizens of the United States of America, and residents of Cincinnati and Fort Thomas, in the counties of Hamilton and Campbell and States of Ohio and Kentucky, have invented a new and useful Improvement in Gasolene-Reservoirs for Automobiles, of which the following is a specification.

It is a matter of common occurrence that, although his supply of gasolene is almost exhausted, a driver of an automobile will pass by a service station and discover that his gasolene is exhausted when he is miles away from any service station.

Our invention relates to a means of notifying a driver of a car that his supply of gasolene is getting low, before it is exhausted.

The object of our invention is an auxiliary gasolene tank for automobiles, which will be filled with gasolene by the filling of the gasolene tank, and from which the gasolene can be drained readily by a manual operation, but not by the regular operation of the automobile.

This object is attained by the means described in the specification and illustrated in the accompanying drawing, in which:—

Figure 1, is a plan view of a gasolene reservoir embodying our invention, part of the tank being broken away to expose the auxiliary tank.

Fig. 2, is a sectional view taken upon line 2—2 of Fig. 1.

Fig. 3, is an enlarged detail view of the inlet of the main tank.

Fig. 4, is an enlarged detail view of one end of the auxiliary tank.

Main tank A is of the usual formation, and is supplied with the usual collar $a$, surrounding the inlet opening and closed by a cap $a'$. Upon the bottom of the main tank A and to one side of the axis of the inlet opening, we mount an auxiliary tank B which is connected by a hinge $b$ to the bottom of the main tank. Adjacent the hinged end and in the top of the auxiliary tank B is an inlet opening within which is a nipple $b'$ which has at its lower end an outwardly flared flange $b^2$. Pivoted to the end of the auxiliary tank, opposite the hinged end, is a rod D whose upper end rests within the flange $a$, and is held in position by a retainer $d$.

In use, gasolene flows into the auxiliary reservoir through the nipple $b'$ when the main tank is filled. The auxiliary reservoir is held in its upright position by the rod D when the cap $a'$ is in position upon the flange $a$. The flange $b^2$ prevents the gasolene from splashing out of the opening, when the car is running.

Should the car stop at a distance from a service station, by the gasolene becoming exhausted, the driver may by removing cap $a$ and pulling on rod D tip the auxiliary tank and supply the main tank on end with sufficient gasolene to carry the car to the next service station.

Having thus described our invention, what we claim is:—

1. A gasolene reservoir for automobiles comprising a main tank, an auxiliary tank within the main tank, and a hinge connecting one end of the auxiliary tank to the bottom of the main tank.

2. A gasolene reservoir for automobiles comprising a main tank, an auxiliary tank within the main tank, and a hinge connecting one end of the auxiliary tank to the bottom of the main tank, the auxiliary tank having an opening near its top in the end that is hinged.

3. A gasolene reservoir for automobiles comprising a main tank, an auxiliary tank within the main tank, and a hinge connecting one end of the auxiliary tank to the bottom of the main tank, the auxiliary tank having an opening near its top in the end that is hinged and in the opening a nipple with an outwardly flared flange within the tank.

4. In a gasolene reservoir the combination of a main tank having an inlet collar and a cap therefor, an auxiliary tank within the main tank and resting upon the bottom thereof, a hinge connecting one end of the auxiliary tank to the main tank and a rod at one of its ends pivoted to the other end of the auxiliary tank and having its other end normally within the inlet collar of the main tank.

In testimony whereof we have hereunto subscribed our names this 16th day of September, 1919.

RICHARD C. ISPHORDING.
GEORGE H. SCHULTZ.